United States Patent [19]

Chandrasekaran et al.

[11] 3,903,045
[45] Sept. 2, 1975

[54] STABILIZED, MELT PROCESSABLE 3,3,3-TRIFLUORO-2-TRIFLUOROMETHYL PROPENE/VINYLIDENE FLUORIDE COPOLYMER COMPOSITIONS

[75] Inventors: Swayambu Chandrasekaran, East Orange, N.J.; Dulari L. Sawhney, New Delhi, India

[73] Assignee: Allied Chemical Corporation, New York, N.Y.

[22] Filed: Dec. 12, 1973

[21] Appl. No.: 424,032

[52] U.S. Cl.. 260/45.75 R; 260/45.7 P; 260/45.7 S; 260/45.7 R; 260/45.75 A; 260/45.75 D; 260/45.75 T; 260/45.75 V; 260/45.75 W
[51] Int. Cl............................ C08f 45/56; C08f 45/62
[58] Field of Search . 260/45.75 R, 45.75 K, 45.7 R, 260/45.7 P, 45.7 S, 87.7

[56] References Cited
UNITED STATES PATENTS

| | | | |
|---|---|---|---|
| 1,932,889 | 10/1933 | Groff | 260/45.75 |
| 2,075,251 | 3/1937 | Winkelmann | 260/45.75 |
| 2,218,645 | 10/1940 | Japs | 260/45.75 |
| 2,406,837 | 9/1946 | Johnston | 260/45.75 |
| 2,629,700 | 2/1953 | Caldwell et al. | 260/45.75 |
| 2,855,266 | 10/1958 | James | 260/DIG. 43 |
| 3,320,206 | 5/1967 | Neros | 260/45.7 |
| 3,712,877 | 1/1973 | Patel et al. | 260/87.7 |
| 3,773,698 | 11/1973 | Khattab et al. | 260/45.75 |

OTHER PUBLICATIONS

S.C.I. Monograph No. 13 (1961) Society of Chemical Industry pp. 275, 276 London, England.

*Primary Examiner*—V. P. Hoke
*Attorney, Agent, or Firm*—Roger H. Criss; Michael S. Jarosz

[57] ABSTRACT

Stabilized, melt-processable compositions are provided which comprise a copolymer of 3,3,3-trifluoro-2-trifluoromethyl propene and vinylidene fluoride and an effective amount of a stabilizing agent selected from the group consisting of the oxides and salts of divalent metals and mixtures thereof. Such divalent metals include the metals of Group II of the Periodic Table and lead, tin and manganese. In general, the stabilizer is present in an amount of at least about 0.20 weight percent of the copolymer.

10 Claims, No Drawings

3,903,045

STABILIZED, MELT PROCESSABLE 3,3,3-TRIFLUORO-2-TRIFLUOROMETHYL PROPENE/VINYLIDENE FLUORIDE COPOLYMER COMPOSITIONS

FIELD OF THE INVENTION

This invention relates to stabilized, melt processable 3,3,3-trifluoro-2-trifluoromethyl propene/vinylidene fluoride copolymer compositions.

DISCUSSION OF THE PRIOR ART

Copolymers of 3,3,3-trifluoro-2-trifluoromethyl propene and vinylidene fluoride and their preparation are described in U.S. Pat. No. 3,706,723 to Chandrasekaran et al., issued Dec. 19, 1972. Such copolymers have melting points of at least 200°C. and contain from about 1 to about 55, preferably from about 10 to 52, mol percent of 3,3,3-trifluoro-2-trifluoromethyl propene and correspondingly about 99 to about 45, preferably about 90 to about 48 mol percent of vinylidene fluoride. The copolymers described therein are melt-processable and resistant to attack by corrosive agents and solvents and are suited for making a wide variety of useful products including films, sheets, solid objects, coatings, fibers, filaments and the like. Such products are especially suitable for use in applications wherein their strength at high temperature, resistance to chemical attack and their good electrical insulating properties may be advantageously employed.

Although the melt stability of the copolymers is acceptable for certain applications, it is below acceptable levels for melt processing techniques which involve exposure to high temperatures for relatively long periods of time.

SUMMARY OF THE INVENTION

According to the present invention, stabilized melt-processable compositions are provided which comprise a copolymer of 3,3,3-trifluoro-2-trifluoromethyl propene and vinylidene fluoride and an effective amount of a stabilizing agent selected from the group consisting of the oxides and salts of divalent metals and mixtures thereof. In general, the stabilizer is present in an amount of at least about 0.20 weight percent of the copolymer.

DESCRIPTION OF THE PREFERRED EMBODIMENTS

Copolymers of 3,3,3-trifluoro-2-trifluoromethyl propene and vinylidene fluoride and their preparation are fully described in the aforementioned U.S. Pat. No. 3,706,723, the disclosure of which is expressly incorporated herein. The copolymers may be prepared by copolymerizing 3,3,3-trifluoro-2-trifluoromethyl propene and vinylidene fluoride monomers by contacting the monomers in a suitable liquid polymerization medium in the presence of a free radical generating polymerization initiator. The copolymers generally contain from about 1 to about 55 mol percent of 3,3,3-trifluoro-2-trifluoromethyl propene, preferably from about 10 to about 52 mol percent of the propene and more preferably from about 40 to about 51 mol percent, and correspondingly mol percentages of vinylidene fluoride. About equimolar copolymers of 3,3,3-trifluoro-2-trifluoromethyl propene and vinylidene fluoride are especially preferred.

The stabilizing agents of the present invention are selected from the group consisting of the oxides and salts of divalent metals and mixtures thereof. Such divalent metals include the metals of Group II of the Periodic Table as well as lead, tin and manganese. In general any salt of these metals, other than their halides, may be employed as the stabilizing agent herein. These salts include among others the sulfates, carbonates, phosphates, acetates, aluminates and borates.

Preferred stabilizing agents are the oxides and sulfates of a Group II metal, especially magnesium, calcium, barium, zinc and cadmium, as well as lead. Exemplary of such preferred stabilizers are calcium oxide, magnesium oxide, barium oxide, zinc oxide, cadmium oxide, lead oxide and calcium sulfate and mixtures thereof. The most preferred stabilizers are calcium oxide and zinc oxide. Illustrative of other stabilizers which may be employed herein are magnesium sulfate, cadmium sulfate, lead sulfate, calcium carbonate, stannous oxide, manganous phosphate, zinc acetate, zinc borate and calcium aluminate.

The stabilizing agents are present in the composition preferably in an amount of at least about 0.20 percent by weight of the copolymer. The upper limit on the stabilizer concentration is generally dictated by economic factors as well as adverse effects upon certain desirable physical properties. In general, the stabilizers are present in a maximum amount of about 30 weight percent. The preferred level of concentration of the stabilizers is about 1 to about 3 percent by weight.

The compositions may be prepared by techniques well known to those skilled in the art. Preferably, the stabilizer is dry blended at room temperature with the copolymer and for this purpose there may be employed conventional mixing apparatus such as ball mills and v-cone blenders. The dry blended mixture may thereafter be melt blended at temperatures in the range of about 330° to about 360°C.

The compositions of this invention are suited for making a wide variety of products including film, sheets, solid objects and the like. The melt processable compositions can be fabricated by conventional extrusion, calendering, molding and other processes.

Other additives may be incorporated into the present compositions. For example, inert fillers, lubricants, pigments, reinforcing agents and the like may be included in the composition by conventional methods.

EXAMPLES

An equimolar copolymer of 3,3,3-trifluoro-2-trifluoromethyl propene and vinylidene fluoride having a melting point of about 327°C. and in the form of particles of a size of about 20 microns and certain additives, identified below, each in the form of a dry powder, were added in various amounts to a laboratory blender and were mixed for five minutes. Eight grams of each composition were charged to a melt rheometer, preheated to 345°C., and after 10 minutes residence time a 2160 gram load was applied, causing the charge to extrude vertically through an orifice. Extrudate cuts were taken at one minute intervals and weighed.

The melt index and relative melt stability index of each sample were determined and the extrudate color noted. The melt index is the total weight of resin extruded during the first 10 minutes after applying the load. The relative melt stability index is the average rate of change in the weight of the first 10 extrudate cuts and is determined by calculating the average of the weight changes between each of the first 10 cuts. A relative melt stability index of zero would indicate a perfectly stable resin whereas a high index (above about 0.025) indicates degradation of the resin due to decreasing polymer viscosity.

The results of the test are given in Table I.

TABLE I

| Sample | Stabilizer | t.% | Melt Index (gms/ 10 min) | Relative Melt Stability Index (gms/min) | Extrudate Color |
|---|---|---|---|---|---|
| 1* | None | 0 | 3.07 | 0.042 | tan |
| 2 | CaO | 2.0 | 1.31 | 0.013 | tan |
| 3 | ZnO | 1.5 | 1.04 | 0.005 | grey |
| 4 | MgO | 2.5 | 1.14 | 0.007 | dark grey |
| 5 | CdO | 2.0 | 1.70 | 0.015 | red-brown |
| 6 | PbO | 2.0 | 1.45 | 0.011 | dark grey |
| 7 | BaO | 2.0 | 2.27 | 0.020 | brown |
| 8 | CaSO₄ | 2.0 | 1.55 | 0.013 | grey-brown |

*comparative test.

From the above table, it can be seen that the addition of the stabilizers of this invention to the copolymer results in low relative melt stability indices. On the other hand, Sample 1 (control) had a high relative melt stability index indicating polymer degradation.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A stabilized melt processable copolymer composition comprising a copolymer of 3,3,3-trifluoro-2-trifluoromethyl propene and vinylidene fluoride, containing from about 1 to about 55 mol percent of 3,3,3-trifluoro-2-trifluoromethyl propene and correspondingly from about 99 to about 45 mol percent of vinylidene fluoride, and an effective amount of a thermal stabilizer selected from the group consisting of oxides, sulfates, carbonates, phosphates, acetates, borates and aluminates of divalent metals and mixtures thereof.

2. The composition of claim 1 wherein the stabilizer is present in an amount of at least about 0.2 percent by weight of the copolymer.

3. The composition of claim 1 wherein the copolymer contains from about 10 to about 52 mol percent of 3,3,-3-trifluoro-2-trifluoromethyl propene and correspondingly from about 90 to about 48 mol percent of vinylidene fluoride.

4. The composition of claim 1 wherein said stabilizer is selected from the group consisting of oxides and sulfates of a metal of Group II of the Periodic Table or lead.

5. The composition of claim 4 wherein said stabilizer is selected from the group consisting of magnesium oxide, calcium oxide, barium oxide, zinc oxide, cadmium oxide, lead oxide and calcium sulfate.

6. The composition of claim 5 wherein said stabilizer is selected from the group consisting of calcium oxide and zinc oxide.

7. The composition of claim 1 wherein said stabilizer is present in an amount of about 1 to 3 percent by weight of the copolymer.

8. The composition of claim 1 wherein the copolymer contains from about 40 to about 51 mol percent of 3,3,-3-trifluoro-2-trifluoromethyl propene and correspondingly from about 60 to about 49 mol percent of vinylidene fluoride.

9. The composition of claim 8 wherein said stabilizer is selected from the group consisting of calcium oxide and zinc oxide and is present in an amount of about 1 to 3 percent by weight of the copolymer.

10. The composition of claim 1 wherein said divalent metals are selected from the group consisting of metals of Group II of the Periodic Table, lead, tin and manganese.

* * * * *